March 18, 1958  R. L. JAESCHKE  2,827,580
DYNAMOELECTRIC ROTOR WITH COOLING FINS
Filed Sept. 3, 1952  2 Sheets-Sheet 1

INVENTOR.
RALPH L. JAESCHKE
BY Hudson, Doughton,
Williams, David & Hoffmann.
ATTORNEYS March 18, 1958

R. L. JAESCHKE 2,827,580

DYNAMOELECTRIC ROTOR WITH COOLING FINS

Filed Sept. 3, 1952

INVENTOR.
RALPH L. JAESCHKE
BY Hudson, Coughton,
Williams, David & Hoffmann
ATTORNEYS

United States Patent Office 2,827,580
Patented Mar. 18, 1958

2,827,580

DYNAMOELECTRIC ROTOR WITH COOLING FINS

Ralph L. Jaeschke, Kenosha, Wis., assignor to Eaton Manufacturing Company, Cleveland, Ohio, a corporation of Ohio Application September 3, 1952, Serial No. 307,657

3 Claims. (Cl. 310—105)

This invention relates to dynamoelectric apparatus and, more particularly, to air-cooled eddy-current devices of the kind embodying characteristics of an electromagnetic slip coupling, clutch, brake, or the like, and as its principal object, provides novel heat dissipating means for such eddy-current devices.

In eddy-current devices of this kind, an inductor rotor is employed having an annular drum member carried by a hub means or carrier and disposed in relatively closely spaced running relation to an annular field unit. During operation of these eddy-current devices, the drum member of the inductor rotor is subject to considerable heating and the dissipation of such heat without harmful effects presents a problem, particularly in view of the fact that when a substantial amount of this heat is permitted to flow into the hub means, it produces an expansion thereof which, if transmitted to the drum member, decreases the operating clearance and results in a scraping or binding of the inductor rotor on the field unit.

This invention accordingly seeks to overcome this problem and, as another of its objects, provides a novel rotor construction by which excessive heat will be effectively dissipated without transfer of any objectionable amount of such heat to the hub means.

Still another object of the present invention is to provide a novel heat dissipating rotor construction for air-cooled eddy-current devices in which fin means projecting from the drum member of the inductor rotor and toward the hub means, extends into and divides an intervening annular space into numerous passages for cooling air, but terminates short of such hub means for preventing the direct conduction of heat to the latter.

A further object is to provide a novel heat dissipating construction of this character, in which the fin means extending into the intervening space between the drum and hub portions includes both connecting fins and interrupted fins.

Yet another object is to provide a novel heat dissipating rotor construction in which the fins are formed as integrally cast portions of a cast metal inductor rotor or of a drum member for such an inductor rotor.

Additionally, this invention provides a novel heat dissipating construction of the kind above referred to, in which the connecting fins constitute supporting struts for an outer rim of the inductor rotor and themselves carry side fins; in which the connecting fins are disposed in groups located between groups of the interrupted fins; in which the outer rim is slotted to divide the same into segments; and in which the ends of the segments are connected to an inner rim or hub means by the groups of connecting fins.

The invention can be further briefly summarized as consisting in certain novel combinations and arrangements of parts hereinafter described and particularly set out in the claims hereof.

Figure 1:
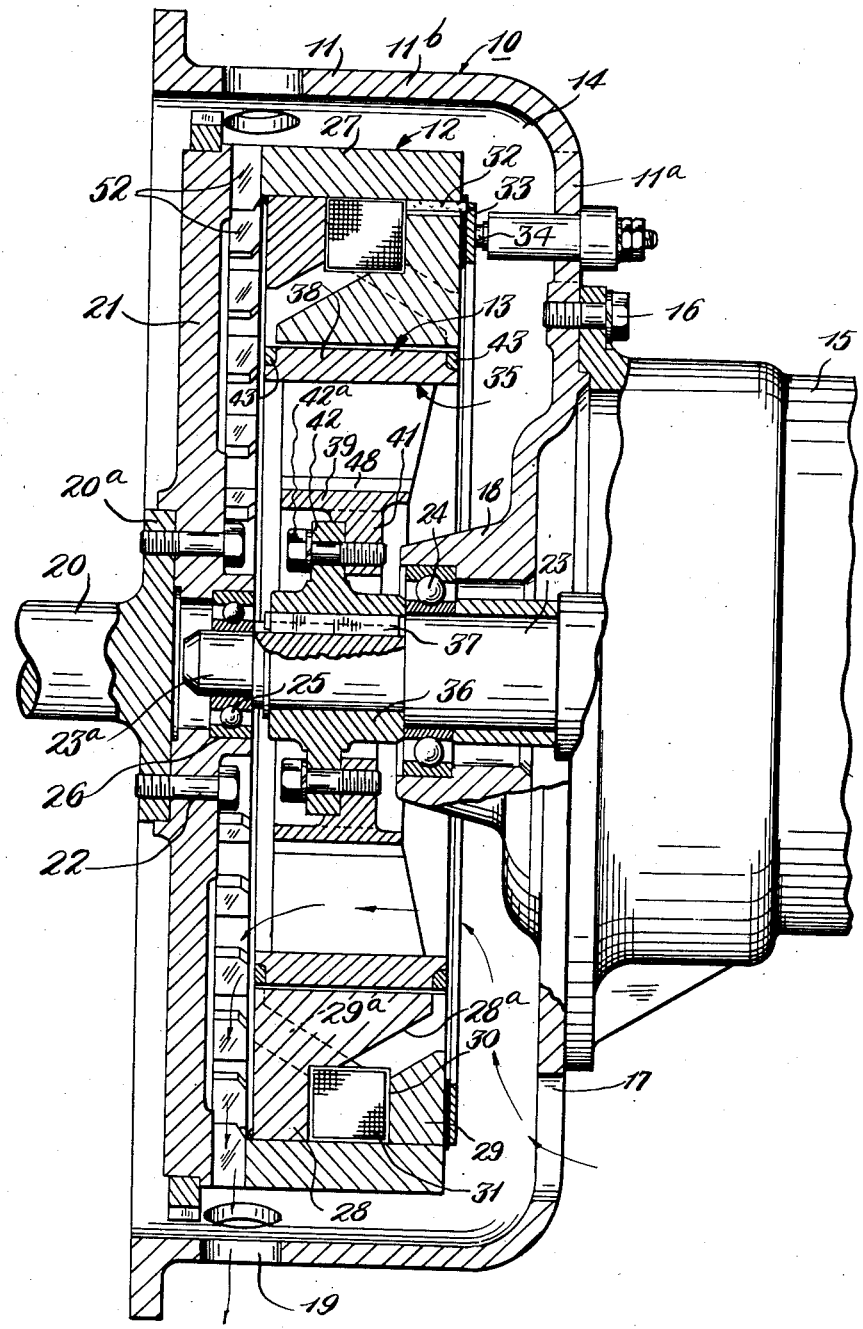
Fig. 1 is a longitudinal axial section taken through a dynamoelectric device embodying the present invention.
Figure 2:
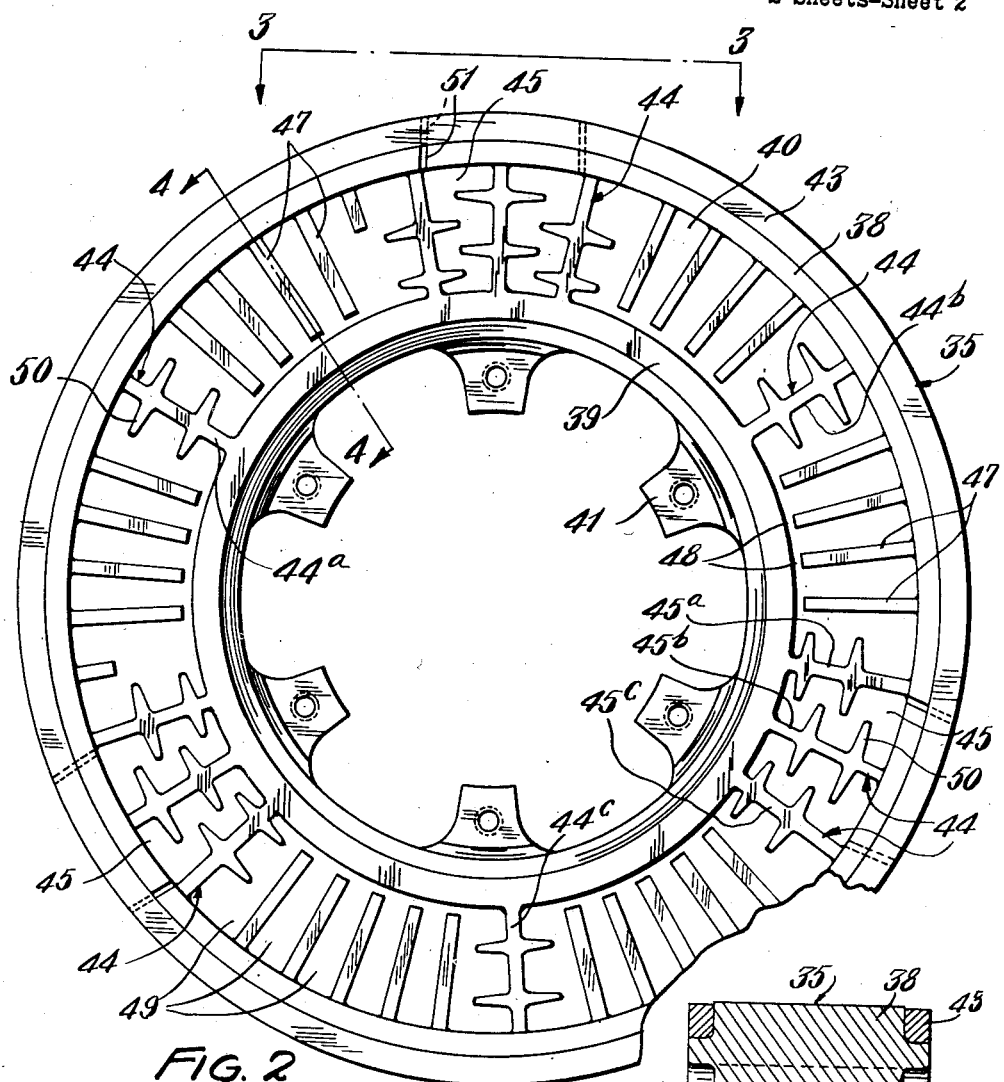
Fig. 2 is an end view showing the drum member of the inductor rotor in detached relation.
Figure 3:
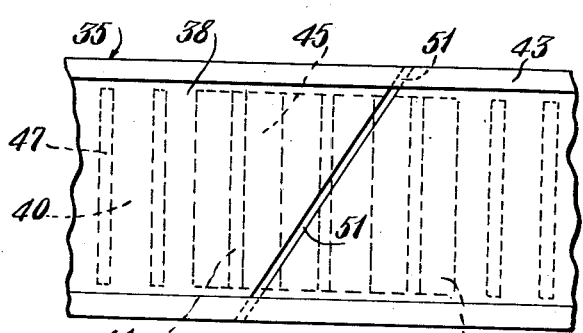
Fig. 3 is a partial outside elevation of the drum member viewed substantially as indicated by section line 3—3 of Fig. 2.
Figure 4:
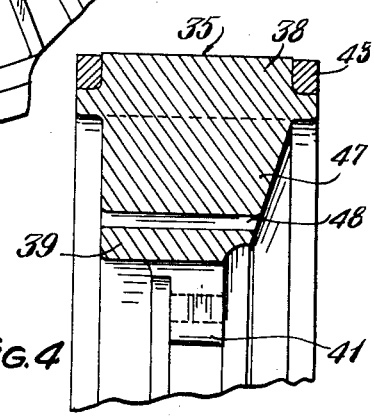
Fig. 4 is a partial transverse section taken through the drum member at the location of one of the interrupted fins substantially as indicated by section line 4—4 of Fig. 2.

As representing one practical embodiment of the present invention, the drawings show a dynamoelectric device 10 which comprises, in general, an outer housing 11, a field rotor 12 and an inductor rotor 13. The rotors 12 and 13 are disposed in a cooperating coaxially nested relation in the housing 11 with the field rotor 12 in surrounding relation to the inductor rotor 13.

The housing 10 comprises a hollow drum-like structure having connected radial and circumferential walls 11$^a$ and 11$^b$ and defining a rotor chamber 14 in which the rotors 12 and 13 operate. The housing 11 is supported by a tubular support member 15 with which the radial wall 11$^a$ is connected, as by the screws 16. The radial wall 11$^a$ of the housing is provided with an annular group of air inlet openings 17 disposed in surrounding relation to an axial hub 18 and the circumferential wall 11$^b$ is provided with an annular group of air outlet openings 19. These inlet and outlet openings provide for a flow of cooling air through the device in cooling contact with the inductor rotor as will be explained hereinafter.

The dynamoelectric machine 10 also comprises a driving shaft 20 having an end flange 20$^a$ thereon and a disk-like flywheel 21 secured to such end flange by the screws 22. A driven shaft 23 extends into the rotor chamber 14 in coaxially aligned relation with the driving shaft 20, through the tubular support member 15 and the hollow hub 18 of the housing 11. The driven shaft 23 is rotatably supported in the hub 18 by the antifriction bearing 24 and has a reduced end portion 23$^a$ rotatably supported by an antifriction pilot bearing 25 mounted in a recess 26 of the flywheel 21.

The field rotor 12 comprises an outer annular rim or drum member 27, which is suitably mounted on the flywheel 21 and carries a pair of axially spaced internal ring members 28 and 29. The ring members 28 and 29 constitute the pole members of the field rotor and cooperate with the drum member 27 in defining an annular pocket or recess 30 in which is located a ring-shaped field winding 31. The ring members 28 and 29 carry groups of annularly spaced, axially extending teeth 28$^a$ and 29$^a$ which are disposed in intermeshing relation and embrace the field winding 31.

One end of the field winding 31 is suitably grounded on the field rotor 12 and its opposite end 32 is connected with a slip ring 33 which is mounted in insulated relation on the ring member 29. A brush 34, cooperating with the slip ring 33 for supplying energizing current to the field winding 31, is mounted in insulated relation on the radial wall 11$^a$ of the housing 11.

The inductor rotor 13 comprises an outer annular drum member 35 disposed in relatively closely spaced running relation to the field rotor 12 and an inner hub member 36, which is connected with the driven shaft 23 by being mounted on the reduced shaft portion 23$^a$ and secured to the latter by the key 37. The drum member 35 of the inductor rotor 13 comprises a pair of outer and inner annular rim elements 38 and 39, having an annularly extending intervening space 40 therebetween. The inner rim element 39 and the hub member 36 are provided respectively with annular groups of circumferentially spaced lugs 41 and 42, which are secured together by connecting screws 42$^a$ for mounting the drum member 35 on this hub member.

In the embodiment of the invention here shown, the drum member 35 and the hub member 36 are shown as being separate parts, although, if desired, the hub member 36 could be formed integral with the drum member, in which case the inner rim element 39 would constitute an integral portion of the hub member. When the inductor rotor 13 is a two-part rotor formed by connected drum and hub members, as shown in the drawings, the inner rim element 39 can be considered as a portion of the hub means.

As shown in Fig. 1, the inductor rotor 13 also includes a pair of axially spaced inductor bars 43 which are preferably in the form of copper rings and are mounted on this rotor by being brazed to edge portions of the outer rim element or drum portion 38 thereof.

As shown in the drawings, the outer rim element or drum portion 38 of the drum member 35 is connected with the inner rim element or hub portion 39 by annularly spaced connecting fins or struts 44 extending therebetween and crosswise of the intervening annular space 40. These connecting fins are here shown as comprising individual connecting fins 44ª, 44ᵇ and 44ᶜ located at three circumferentially spaced points of the drum member 35, and three groups 45 of such connecting fins located at other circumferentially spaced points of the drum member and which points are intermediate the pairs of the individual connecting fins 44ª, 44ᵇ and 44ᶜ. Each of the fin groups 45 comprises three individual connecting fins 45ª, 45ᵇ and 45ᶜ disposed in adjacent circumferentially spaced relation to each other.

At points between the individual connecting fins 44 and the fin groups 45, the drum member 35 is provided with groups of annularly spaced other fins 47 which are connected with and carried by the other rim elements 38. The fins 47 project into the intervening space 40 and extend to a point adjacent to, but terminate short of the inner rim element 39. Since the inner ends of the fins 47 are spaced from the inner rim element 39 by the separating spaces or interruptions 48, these fins can be conveniently referred to as interrupted fins. The connecting fins 44 and the interrupted fins 47 divide the intervening annular space 40 into a relatively large number of air passages 49 which extend through the drum member 35 axially thereof and accommodate a flow of the above-mentioned cooling air through the inductor rotor 13.

As has been indicated above, the drum member 35 of the inductor rotor 13 is subject to a substantial amount of heating during the operation of the dynamoelectric machine 10, as the result of eddy-currents produced in the drum member and particularly in the outer rim element 38 thereof. By the present invention, any harmful amount of this heat is prevented from being transmitted to the hub means 36 by the connecting and interrupted fins 44 and 47 of the drum member, which act as cooling fins in dissipating the excess heat of the drum member 35. Since the interrupted fins 47 are isolated from the inner rim element 39 by the spaces 48, a direct heat conducting metallic path through these fins is prevented, such that even though a substantial amount of heat is generated in the outer rim element 38 of the drum member 35, it cannot flow directly to the hub means through the fins 47 where it would produce undesirable expansion effects in the machine.

To assist in dissipating the heat generated in the outer rim element or drum portion 38 of the inductor rotor 13, the individual and grouped connecting fins 44 are all provided with circumferentially extending side fins 50 at radially spaced points thereof and which side fins project into the air passages 49. The side fins 50 of the connecting fins 45ᵇ are displaced radially outwardly of the drum member with respect to the side fins of the connecting fins 45ª and 45ᶜ, such that the side fins of the connecting fins of the groups 45 have a staggered relation. The heat in the drum portion 38, which endeavors to reach the hub means by traversing the individual connecting fins 44 and the connecting fins of the groups 45, will be largely dissipated to the cooling air through the side fins 50, such that only a relatively small amount of such heat will actually reach the hub means.

The outer rim element 38 of the drum member 35 is here shown as having oblique slots 51 therein and extending thereacross at three circumferentially spaced points and by which this rim element is divided into three segments. The slots 51 are provided in the rim element 38 at the locations of the groups 45 of connecting fins, such that the adjacent ends of the contiguous segments will be connected with the inner rim element 39 by the connecting fins of these groups.

As shown in Fig. 1, the flywheel 21 is provided with an annular series of air impelling blades 52 which constitute a centrifugal impeller means for discharging air from the housing 11 through the air outlet openings 19. The discharge of air from the housing through the openings 19 induces a flow of cooling air into the rotor chamber 14 through the inlet openings 17, and also causes such cooling air to flow through the passages 49 of the inductor rotor 13 in heat dissipating relation to the interrupted fins 47, the connecting fins 44 and the side fins 50 of the connecting fins.

In accordance with the present invention, the drum member 35 of the inductor rotor 13 is constructed as a one-piece metal casting in which the rim elements 38 and 39 are integrally connected with each other by the connecting fins or struts 44 and in which the interrupted fins 47 are formed as integral finger-like projections of the outer rim element 38. The connecting lugs 41 are also formed as integrally cast portions of this one-piece cast metal drum member.

From the foregoing description and the accompanying drawings, it will now be readily understood that this invention provides a dynamoelectric machine of the type embodying an eddy-current inductor rotor which is subject to heating and in which a novel heat dissipating construction disposes of the excess heat without harmful or disadvantageous results. It will now also be understood that with the novel heat dissipating construction provided by this invention, such a dynamoelectric machine is capable of efficient and satisfactory operation even though the drum portion of the inductor rotor may rise to a relatively high temperature, because the direct transfer of the excess heat to the hub means is prevented and the relatively close running relation between the inductor rotor and the field unit can be maintained without scraping or other mechanical interference therebetween. Additionally, it will be seen that with the heat dissipating construction provided by this invention the inductor rotor, or the drum member thereof, can be readily produced as a one-piece unitary metal casting.

Although the present invention has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In an electrical machine, an inductor drum which is subject to heating comprising; outer and inner substantially cylindrical rim elements disposed in a directly radially opposite relation and having an intervening circumferential space therebetween; groups of circumferentially spaced substantially radially extending interrupted fins connected with one of said rim elements and extending toward but terminating short of and at a point immediately adjacent to the other of said rim elements; struts extending substantially radially across said intervening space between said groups of interrupted fins and connecting said outer and inner rim elements; said interrupted fins and said struts being in the form of substantially flat blades having an axial width comparable with that of at least one of said rim elements; and radially spaced side fins carried by said struts; said side fins being substantially axially coextensive with said struts and extending substantially circumferentially in said space toward the adjacent ones of said interrupted fins but terminating short of the latter; said inductor drum being a one-piece metal casting with said rim elements, interrupted fins, struts and side fins being integrally connected portions of said one-piece casting, said intervening space being divided into numerous transverse air passages by said fins and struts.

2. In an electrical machine, an inductor drum which is subject to heating comprising outer and inner coaxial annular rim elements disposed in a directly radially opposite relation and having an intervening circumferential space therebetween, groups of substantially radially extending interrupted fins connected with one of said rim elements and extending toward but terminating short of and at a point immediately adjacent to the other of said rim elements, groups of struts extending substantially radially across said intervening space between said groups of interrupted fins and connecting said outer and inner rim elements, and radially spaced side fins carried by said struts and projecting from opposite sides thereof, said side fins extending circumferentially in said space with the side fins of adjacent struts in radially offset relation, one of said rim elements being an annularly continuous mounting rim having connecting means for connecting said drum with a carrier and said other rim element having slots therein at the locations of said groups of struts and dividing said other rim element into segments, said drum including said rim elements, struts and fins comprising a unitary metal casting.

3. In a dynamoelectric machine; a housing; a pair of cooperating nested coaxial rotors rotatable in said housing; one of said rotors being a field rotor carrying field coil means and the other of said rotors being an inductor rotor having a drum member subject to heating; said drum member comprising outer and inner annular rim elements disposed in a directly radially opposite relation and having an annular space therebetween, and cooling fin means spaced apart circumferentially of said drum member and extending between said rim elements substantially radially crosswise of said space; said housing having air inlet and outlet means for a flow of cooling air therethrough; said fin means comprising groups of struts connecting said rim elements and carrying radially spaced side fins, and interrupted fins disposed between said groups of struts and carried by one of said rim elements and extending toward the other of said rim elements and terminating in free ends located in an immediately adjacent spaced relation to said one rim element; said intervening space being divided into numerous passages by said fin means for the flow of said cooling air through said inductor rotor; and air impelling means carried by said field rotor and effective to produce said flow of cooling air; said interrupted fins and said struts being in the form of substantially flat blades having an axial width comparable with the axial width of at least one of said rim elements; said side fins being substantially axially coextensive with said struts and extending substantially circumferentially in said space toward the adjacent ones of said interrupted fins but terminating short of the latter; said drum member being a one-piece metal casting with said rim elements, struts, interrupted fins, and side fins all being integrally connected portions of said casting.

References Cited in the file of this patent

UNITED STATES PATENTS

| | | |
|---|---|---|
| 1,193,897 | Holbech | Aug. 8, 1916 |
| 1,685,677 | Maxwell | Sept. 25, 1928 |
| 2,215,421 | Eksergian | Sept. 17, 1940 |
| 2,357,517 | Burdick | Sept. 5, 1944 |
| 2,428,104 | Winther | Sept. 30, 1947 |
| 2,452,820 | Winther | Nov. 2, 1948 |
| 2,668,922 | Burdick | Feb. 9, 1954 |

FOREIGN PATENTS

| | | |
|---|---|---|
| 19,891 | Great Britain | of 1908 |
| 385,022 | France | Feb. 25, 1908 |
| 434,969 | Germany | Oct. 6, 1926 |
| 504,351 | Germany | Aug. 2, 1930 |
| 528,293 | Great Britain | Oct. 25, 1940 |